United States Patent [19]
Smith et al.

[11] Patent Number: 5,132,827
[45] Date of Patent: Jul. 21, 1992

[54] OPTICAL FIBRE COMMUNICATION LINK FOR CONNECTING A PERIPHERAL DEVICE TO A COMPUTER SYSTEM

[75] Inventors: Kenneth G. Smith, Chandlers Ford; David Sawdon, Winchester, both of England

[73] Assignee: International Business Machines Corporation, Armonk, N.Y.

[21] Appl. No.: 789,240

[22] Filed: Nov. 6, 1991

Related U.S. Application Data

[63] Continuation-in-part of Ser. No. 568,110, Aug. 16, 1990, abandoned.

[30] Foreign Application Priority Data

Sep. 6, 1989 [GB] United Kingdom ............... 8920117

[51] Int. Cl.$^5$ ............................................. H04B 10/00
[52] U.S. Cl. ..................................... 359/154; 358/172
[58] Field of Search ................... 359/154, 161, 173; 358/142, 143, 145, 172

[56] References Cited

U.S. PATENT DOCUMENTS

| | | | |
|---|---|---|---|
| 2,624,797 | 1/1953 | Lawson et al. | 358/145 |
| 4,018,986 | 4/1977 | Wilk | 358/142 |
| 4,110,787 | 8/1978 | Parker | 358/172 |
| 4,216,492 | 8/1980 | Schmalz | 358/142 |
| 4,739,521 | 4/1988 | Akimoto | 455/617 |
| 4,760,442 | 7/1988 | O'Connell et al. | 455/617 |
| 4,863,233 | 9/1989 | Nienaber et al. | 455/617 |

FOREIGN PATENT DOCUMENTS 0174099 6/1984 European Pat. Off. .
61-188513 8/1986 Japan .

OTHER PUBLICATIONS

IBM TDB vol. 33, No. 3A, Aug. 1990, pp. 403-404.

Primary Examiner—Edward L. Coles, Sr.
Assistant Examiner—Kinfe-Michael Negash
Attorney, Agent, or Firm—Joscelyn G. Cockburn

[57] ABSTRACT

An optical fibre communications link, for connecting a peripheral device to a computer system is presented, which includes circuit arrangement for generating a hybrid video signal, a device for transmitting such a signal along an optical fibre between the computer system and the peripheral device, characterized in that the transmitted video signal includes a reference pulse of predetermined amplitude, compensation devices for correcting changes in the characteristics of a received video signal which result from the optical communication link, and circuitry for using the reference pulse in a received video signal in order to control the compensation means.

18 Claims, 3 Drawing Sheets

DYNAMIC RANGE OF AN
OPTICAL COMMUNICATION LINK

BLOCK DIAGRAM OF AN
EXAMPLE TRANSMITTER SCHEMATIC

BLOCK DIAGRAM OF
AN EXAMPLE RECEIVER
SCHEMATIC

OPTICAL FIBRE COMMUNICATION LINK FOR CONNECTING A PERIPHERAL DEVICE TO A COMPUTER SYSTEM

This is a continuation-in-part of copending application(s) Ser. No. 07/568,110 filed on Aug. 16, 1990 now abandoned.

The present invention relates to an analogue optical interface, more particularly for use as part of a communications link between a computer system and a peripheral device such as a data display device.

Prior art communication links between computer systems and peripheral devices typically involve the transmission of a video signal in the form of a time-variant current passing through electrically conductive copper wires.

Within the art, a video signal consists of a continuous flow of analogue information which is sequenced in a manner compatible with a display device and to this end a periodic "blanking" interval can be included in such a sequence for control purposes.

By the nature of display apparatus, the frequency of a video signal is typically several tens of Megahertz. The signal carrying wires are therefore conventionally clad in a conductive screen connected to earth, such that radio frequency emissions are minimised. This is necessary to prevent undesirable radio frequency interference (RFI) which can clearly exit between a host computer system and peripheral apparatus disturbing the normal operation of the host computer system or any other sensitive electrical equipment in the vicinity of the communications link.

With the trend towards increased image definition, requiring faster video signals, the need has arisen to examine new techniques for connecting the display device to a display adapter. Conventional screening methods, an example of which is described above, have bandwidth limitations such that RFI from electrical cabling becomes significant when such video rates are used. Furthermore, a signal attenuation factor can be associated with these commands.

EP-A-0,174,099 describes a fibre optic terminal interface which overcomes the RFI problems mentioned above by multiplexing monochrome digital video signal with Manchester-coded ancillary information, such as keyboard control data and sound synthesis data, onto a single optical fibre link between a host data processor and a user display terminal. The Manchester-encoded data has a clock rate which is tied to a video dot clock rate and is multiplexed onto the optical link during a horizontal scan retrace (blanking) period.

A feature of low cost opto-electronic devices is poor electron to photon conversion efficiency which can vary significantly between nominally identical devices. A typical optical link, composed of a light emitting diode (LED) connected to PIN diode via an optical fibre, may provide only 20 uA output current for 100 mA input. It follows therefore that a high gain, low noise amplifier would be required in the receiver. Although the application of an optical link to the transmission of an analogue video signal is suggested in EP-A-0,174,099, there is no facility for regulating the transfer function of such a link under the conditions discussed, and therefore a communication scheme as specified cannot be extended to the matching of a plurality of nominally identical optical communication channels (for example, the red, green, and blue video channels of a colour display system).

The aim of the present invention is to prevent a communications link from emitting objectionable levels of RFI by replacing electrical wires with optical fibres which are compatible with analogue video communication; the video signals being represented by time variant luminance signals.

According to one aspect of the invention, an optical fibre communications link, for connecting a peripheral device to a computer system is presented, which includes means for generating a video signal, means for transmitting such a signal along an optical fibre between the computer system and the peripheral device, characterised in that the transmitted video signal includes a reference pulse of predetermined amplitude, compensation means for correcting changes in the characteristics of a received video signal which result from said optical communication link, and means for using said reference pulse in a received video signal in order to control said compensation means.

A dynamic range, conventionally assigned to an optical communication link, defines maximum and minimum signal amplitudes allowed therein.

By way of a second aspect of the invention, the aforementioned dynamic range is further partitioned into a plurality of subsections such that said reference pulse occupies a first range of amplitude, said video signal occupies a second range of amplitude, with the provision for video synchronisation pulses to occupy a third range of amplitude.

In one preferred arrangement the reference pulse is included in the video signal during periodic blanking intervals.

This construction achieves the advantage that a communicated signal is both transmitted and received most conveniently by electrical means. It follows that where the compensation means consists of a plurality of electrical circuits, a partition of the dynamic range corresponds to a threshold voltage determined by the compensation means.

Furthermore, in the event of the operation of a peripheral device and the dynamic range of the optical communication link permitting, the aforementioned reference pulse may take the form of a video synchronisation pulse.

One specific embodiment of the invention will now be described with the aid of the accompanying diagrams in which.

Figure 1:
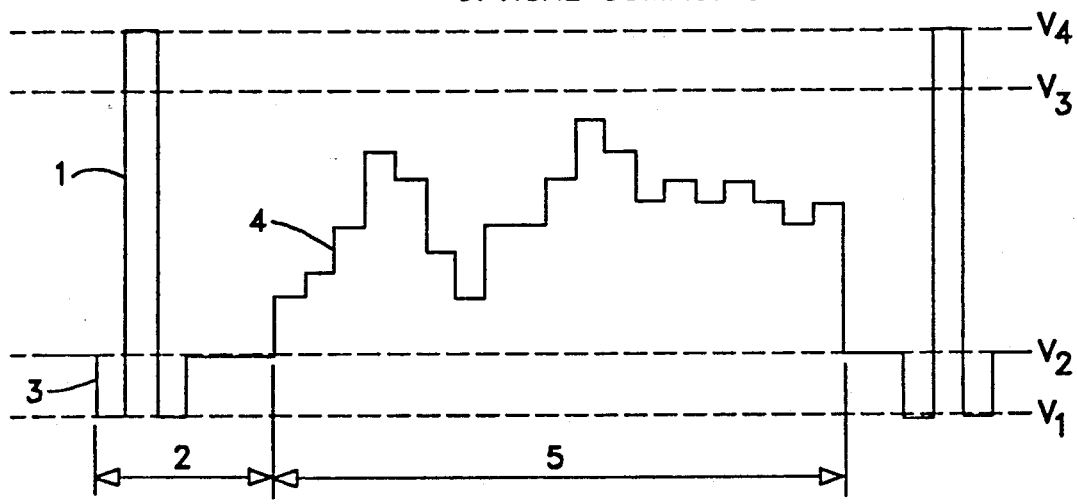
FIG. 1 illustrates a partitioning of the dynamic range of the communications link.

FIG. 1 shows a sequence of data suitable for communication via an optical link, consisting of:
  a) An amplitude reference pulse (1) of amplitude V4-V2 occuring during a blanking period (2).
  b) Option for control signals (3) of amplitude V2-V1.
  c) An analogue information signal (4), occuring for an active video period (5), with an amplitude bounded by extremes V2 and V3.
where V1, V2, V3, V4 are electrical voltages and the range between V1 and V4 is the electrical signal space available to the optoelectronic interface circuitry of both the transmitter and the receiver.

Figure 3:
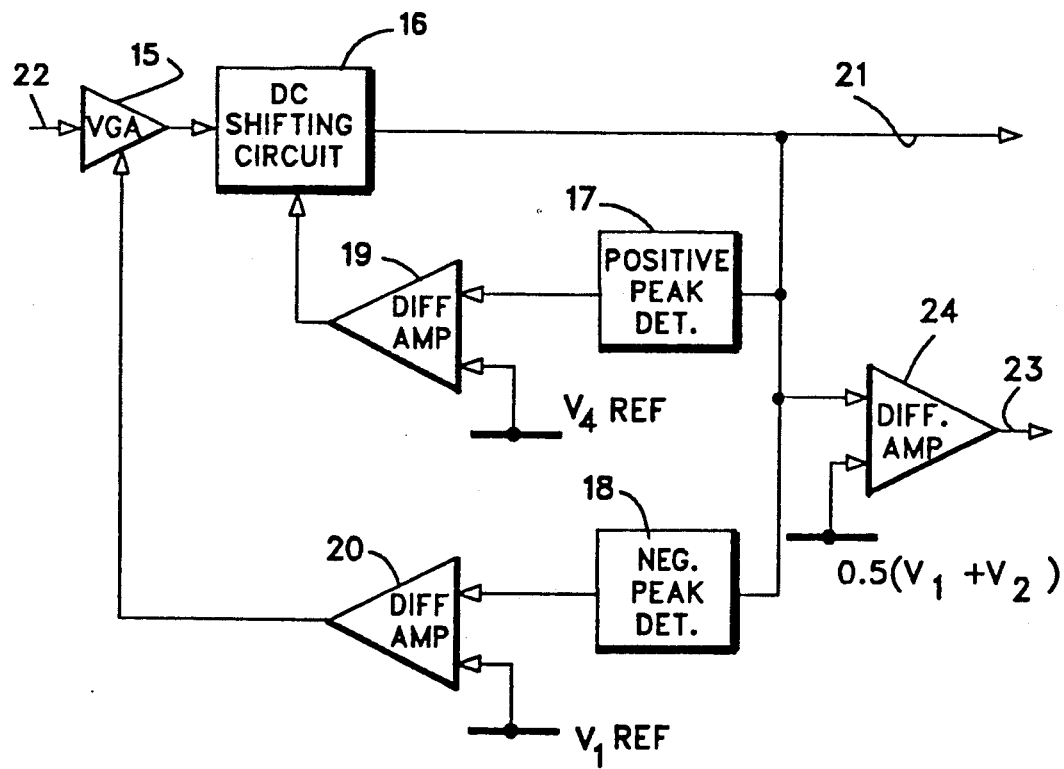
FIG. 3 is a functional block diagram of a system for receiving information from the communication link.
Figure 4:
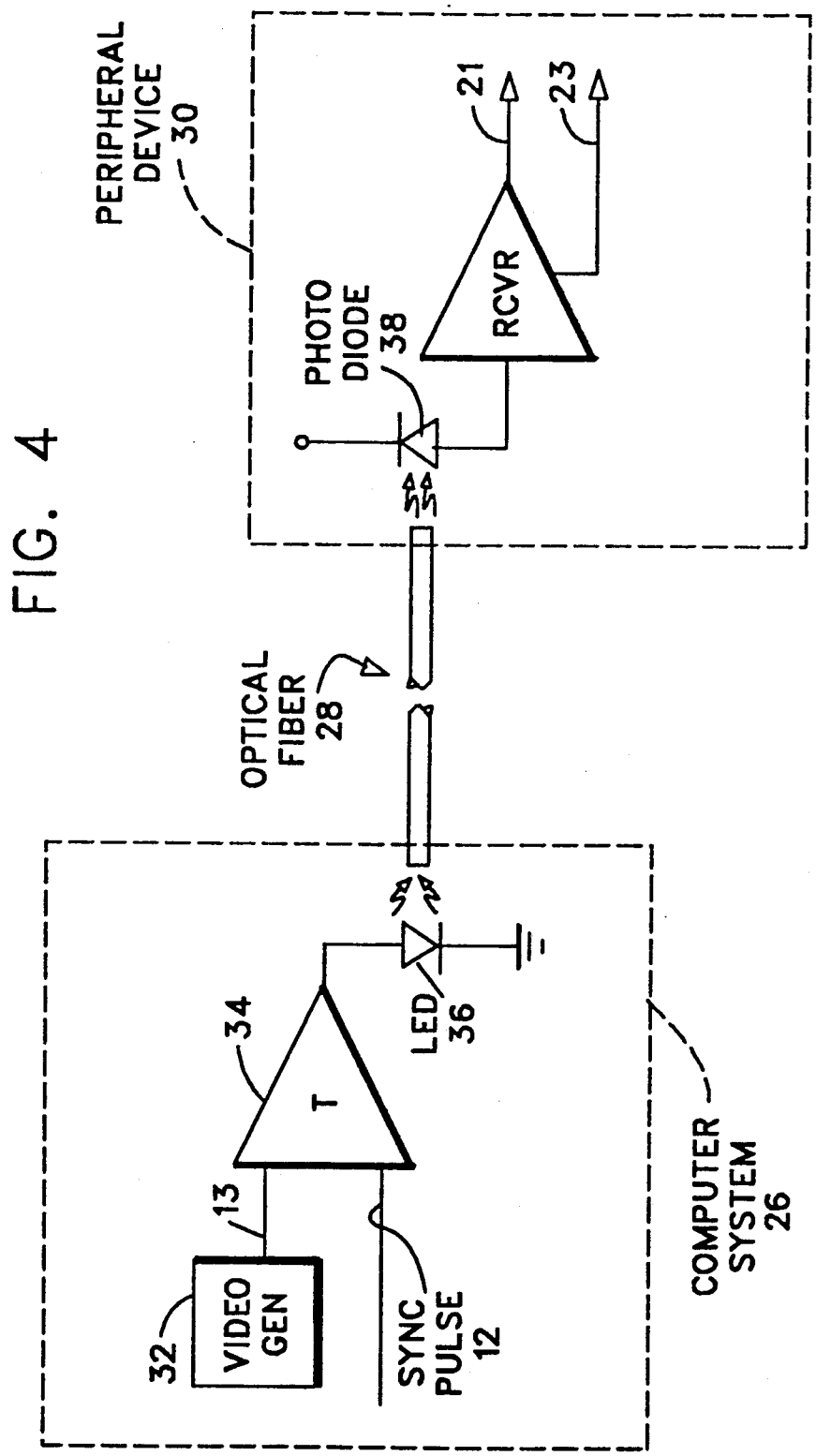
FIG. 4 is a functional block diagram of an optical fibre communications link.

FIG. 4 shows a functional block diagram of the computer system 26 interconnected by optical fibre 28 to peripheral device 30. The computer system 26 further includes video generator 32, transmitter (T) 34 and LED 36. The peripheral device 30 includes photo diode 38 and receiver 40. Details of of the transmitter (T) 34 and receiver (RCVR) 40 are set forth in FIGS. 2 and 3, respectively, and are described below. Suffice it to say that video signal 13 and synchronization (sync) pulse 12 are processed by T 34 (details given below) to generate the video signal of FIG. 1 (details given above). The video signal is converted by LED 36 into an optical signal and transmitted along optical fibre 28 to photo diode 38 which converts the optical signal into an electrical signal and forwards it to the RCVR 40. The electrical signal is processed by RCVR 40 (details given below) to generate video signal 21 and synchronization signal 23. The video generator (Gen) 32 which generates the video signal 13 and sync pulse 12 are conventional off-the-shelf devices. For example, pages 170-171 of "Computer Data Displays," by Samuel Davis, Prentice-Hall, Inc., 1969, describes a digital to video display processing subsystem for generating video and sync signals. Such a system or any other conventional system could be used to generate video signals 13 and sync signals or pulses 12. To the extent necessary, the cited literature is incorporated herein by reference.

Figure 2:
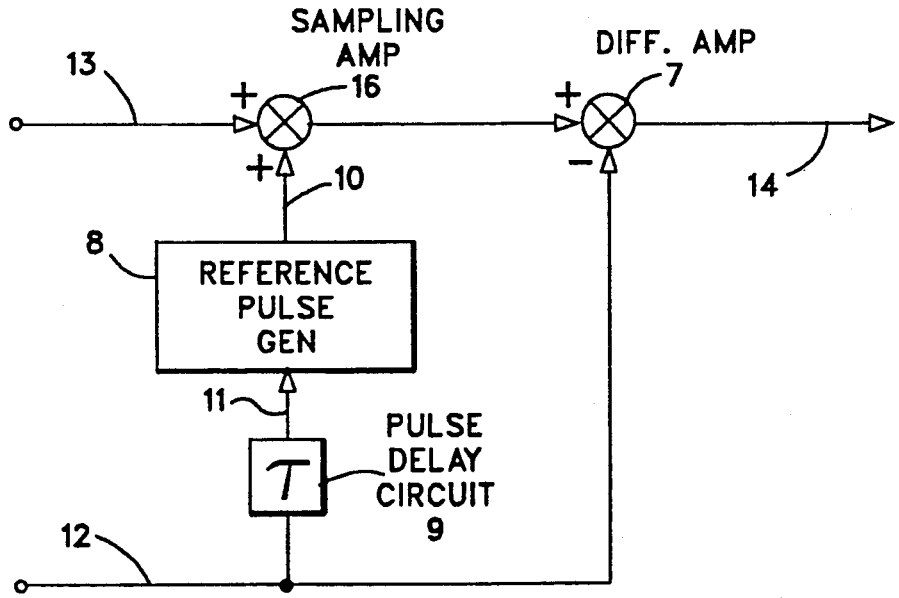
FIG. 2 is a functional block diagram of a system for transmitting information along the communication link.

FIG. 2 shows one system structure which can be used to generate such a signal as that shown in FIG. 1. Block 6 is a summing amplifier. Block 7 is a difference amplifier. Block 8 is reference pulse generator. Block 9 is a pulse delay circuit. An amplitude reference pulse (10) is generated by block 8 whenever a delayed synchronisation pulse (11) triggers a circuit such as a monostable multivibrator, for example. The synchronisation pulse may be delayed in order to prevent the reference pulse adding objectionable detail to a displayed image. The amplitude reference pulse is added to input video signal (13) by summing amplifier 6. A further synchronisation pulse can be included in the output video signal (14) via difference amplifier 7.

In an alternative to the example shown in FIG. 2, a digital to analogue convertor in a display adapter system can also generate a signal such as that shown in FIG. 1.

FIG. 3 shows one receiver structure for such a signal as that shown in FIG. 1. Block 15 is a variable gain amplifier (VGA). Block 16 is a unity gain DC level shifting circuit. Block 17 is a positive peak voltage detector. Block 18 is a negative peak voltage detector. Blocks 19 and 20 are both difference amplifiers.

The most positive level of the receiver output signal (21) is maintained at V4 in a feedback process whereby the most positive peak of the receiver output signal is extracted by block 17 and compared with a fixed V4 reference level at the input to block 19. The voltage output from block 19, which indicates an error in the receiver output amplitude, is used in block 16 to adjust the DC level of the receiver output signal.

The most negative level of the receiver output signal is maintained at V1 by a feedback process whereby the most negative peak of the receiver output signal is extracted by block 18 and compared with a fixed V1 reference level at the input to block 20. The voltage output from block 20, which indicates an error in the receiver output amplitude, is used in block 15 to adjust the gain of a variable gain amplifier acting on the input 22 to the receiver.

Recovery of any information synchronisation signals (23) which may be present can be simply effected by comparing (24) the receiver output signal to a threshold voltage equal to:

$$0.5(V1+V2)$$

For the purpose of this description, a video signal may be continuous flow of analogue information which is sequenced in a manner compatible with any peripheral device, not necessarily a display device.

Although a communication link between a display device and a computer system has been highlighted in the description, it would be obvious to one skilled in the art that the same principles as those described could be used to connect a computer system to any suitable peripheral device.

We claim:

1. An optical fibre communications link for connecting a peripheral device to a computer system comprising:
    means for generating a video signal bounded by a dynamic range of voltages and having analog information signals, reference pulses and control signals;
    means for transmitting the video signal along an optical fibre interconnecting the computer system and the peripheral device;
    compensation means, in the peripheral device, for adjusting the video signal to correct changes in its characteristics caused by the optical fibre communications link; and
    means for using said reference pulses in received video signals to control said compensation means.

2. An optical fibre communications link as claimed in claim 1, wherein the dynamic range of voltages is partitioned into a plurality of subsections.

3. An optical fibre communications link as claimed in claim 2 wherein said dynamic range is partitioned such that said reference pulse occupies a first range of amplitude, said video signal occupies a second range of amplitude, and said control signals occupy a third range of amplitude.

4. An optical fibre communications link as claimed in claim 1 in which said reference pulse is included in said video signal during periodic blanking intervals.

5. An optical fibre communication link as claimed in claim 1 in which a signal is both initially transmitted and eventually received by electrical means.

6. An optical fibre communication link as claimed in claim 1 in which said compensation means consists of a plurality of electrical circuits.

7. An optical fibre link as claimed in claim 3 wherein a partition of said dynamic range corresponds to threshold voltages used in the peripheral device to determine signals for controlling said compensation means.

8. An optical fibre communication link as claimed in claim 3 in which said control signals include video synchronisation pulse.

9. An optical fibre communications link for connecting a peripheral device to a computing system comprising:
    means for generating input video signals;
    means responsive to the video signal for generating composite video signals comprising the input video signals and reference pulses of predetermined amplitude;

means for transmitting the composite video signals along an optical fibre interconnecting the computing system and the peripheral device;

compensation means, positioned in the peripheral device, for receiving the composite video signals, said compensation means performing adjustments on said video signals to correct changes introduced in said composite video signals by the optical fibre communications link; and control means responsive to the reference pulses to generate control signals which activate the compensation means to perform said adjustments.

10. The optical fibre communications link of claim 9 wherein the means for generating the composite video signals include a summing amplifier (6) with an input to recieve the input video signals;

a reference pulse generator (8) coupled to another input of said summing amplifier; and a pulse delay circuit (9) for delaying a synchronization pulse connected to the reference pulse generator.

11. The optical fibre communications link of claim 10 further including a differential amplifier coupled to an output of said summing amplifier and an input of the pulse delay circuit; said differential amplifier responsive to the composite video signals to insert the synchronization pulses in said composite video signals.

12. The optical fibre communications link of claim 9 wherein the compensation means includes a variable gain amplifier (15) with an input to receive a control signal, an input to receive the composite video signals and an output; and a DC level shifting circuit connected to the output of said variable gain amplifier.

13. The optical fibre communications link of claim 12 wherein the control means includes:

a positive peak detector for detecting positive peaks of the reference pulses contained in received composite video signals; and a first circuit arrangement for comparing the positive peaks with a positive fixed reference voltage level and to generate an error signal which is coupled to the DC level shifting circuit.

14. The optical fibre communications link of claim 13 wherein the first circuit arrangement includes a differential amplifier.

15. The optical fibre communications link of claim 13 wherein the control means further includes:

a negative peak detector for detecting negative peaks of the reference pulses contained in received composite video signals; and a second circuit arrangement for comparing the negative peaks with a negative fixed voltage level to generate an error signal which is coupled to the variable gain amplifier.

16. The optical fibre communications link of claim 15 wherein the second circuit arrangement includes a differential amplifier.

17. A circuit arrangement for use in a transmission system having a computer system interconnected by a fibre optic link to a peripheral device, said circuit arrangement comprising:

a variable gain amplifier for receiving signals having a video section, reference pulses and control pulses;

a DC shifting circuit means coupled to an output of said variable gain amplifier;

a first circuit means for monitoring the signals to extract postive peaks of the reference pulses and to generate a first set of signals representative of said positive peaks;

a second circuit means having an output coupled to the DC shifting circuit means, an input coupled to the first circuit means and another input coupled to a first reference voltage level; said second circuit means comparing the first reference voltage level with the first set of signals to generate a first error signal to drive said DC shifting circuit means;

a third circuit means for monitoring the signals to extract negative peaks of the reference pulses and to generate a second set of signals representative of said negative peaks; and a fourth circuit means having an output coupled to the variable gain amplifier, an input coupled to the third circuit means and another input coupled to a second reference voltage level; said fourth circuit means comprising the second reference voltage level with the second set of signals to generate a second error signal which adjust the gain of the variable gain amplifier.

18. In a computer system having an optical fiber communications link interconnecting the computer system and a perpheral device and means positioned in said computer system for generating video signals, a circuit arrangement comprising:

first means positioned in said computer system for generating reference pulses of predetermined amplitude;

second means for combining the reference pulses and the video signals to form a composite video signal which is transmitted through the optical fiber communications link to the peripheral device;

third means, positioned in the peripheral device, responsive to the reference pulses in said composite video signal to generate control pulses; and compensation means, positioned in the peripheral device, responsive to the control pulses to adjust said composite video signal to correct changes introduced in said video signal.

* * * * *